(12) United States Patent
Foster et al.

(10) Patent No.: US 9,934,919 B2
(45) Date of Patent: Apr. 3, 2018

(54) LOCKING SWITCH ASSEMBLY AND RELATED METHODS

(71) Applicant: ROCKWELL AUTOMATION TECHNOLOGIES, INC., Mayfield Heights, OH (US)

(72) Inventors: Wayne R. Foster, Tyngsborough, MA (US); Prachi S. Kulkarni, Burlington, MA (US); Joshua Vavra, Derry, NH (US); James Edward Dogul, Hudson, NH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 557 days.

(21) Appl. No.: 14/539,723

(22) Filed: Nov. 12, 2014

(65) Prior Publication Data

US 2015/0137622 A1    May 21, 2015

Related U.S. Application Data

(60) Provisional application No. 61/903,356, filed on Nov. 12, 2013.

(51) Int. Cl.
*F16P 3/08* (2006.01)
*H01H 27/06* (2006.01)

(52) U.S. Cl.
CPC ............... *H01H 27/06* (2013.01); *F16P 3/08* (2013.01); *Y10T 307/97* (2015.04)

(58) Field of Classification Search
CPC .......................................................... F16P 3/08

USPC .................................................. 307/139, 326
See application file for complete search history.

(56) References Cited

U.S. PATENT DOCUMENTS

| | | | | |
|---|---|---|---|---|
| 5,245,329 A * | 9/1993 | Gokcebay | .......... | G07C 9/00087 235/382.5 |
| 6,382,003 B1 * | 5/2002 | Watanuki | ................ | B60R 25/04 70/184 |
| 6,965,295 B2 * | 11/2005 | Shimonomoto | ...... | B60R 25/246 340/10.34 |
| 6,980,672 B2 * | 12/2005 | Saito | .................. | G06K 9/00006 340/5.53 |
| 7,009,490 B2 * | 3/2006 | Wong | ...................... | B60R 25/00 340/12.22 |
| 8,347,674 B2 * | 1/2013 | Trempala | ........... | G07C 9/00309 340/5.7 |
| 8,922,333 B1 * | 12/2014 | Kirkjan | .............. | G07C 9/00309 235/376 |
| 2005/0051621 A1 * | 3/2005 | Wong | ................. | G07C 9/00309 235/382.5 |

(Continued)

*Primary Examiner* — Adi Amrany
(74) *Attorney, Agent, or Firm* — Viksnins Harris Padys Malen LLP

(57) ABSTRACT

A control assembly includes a locking device having at least a first mode of operation and a second mode of operation, the locking device configurable to change from the first mode of operation to the second mode of operation. The locking device has a non-contact sensor and a microcontroller. An independent communicator is configured to communicate configuration data to the microcontroller. The microcontroller is configured to change from the first mode of operation to the second mode of operation using configuration data received from the independent communicator.

16 Claims, 3 Drawing Sheets

(56) References Cited

U.S. PATENT DOCUMENTS

| | | | | |
|---|---|---|---|---|
| 2006/0164206 | A1* | 7/2006 | Buckingham | E05B 47/00 340/5.6 |
| 2009/0184801 | A1* | 7/2009 | Bliding | E05B 49/00 340/5.61 |
| 2011/0156866 | A1* | 6/2011 | Denison | B60R 25/102 340/5.54 |
| 2012/0011367 | A1* | 1/2012 | Denison | G07C 9/00571 713/170 |
| 2012/0229251 | A1* | 9/2012 | Ufkes | E05B 47/0004 340/5.26 |
| 2012/0270496 | A1* | 10/2012 | Kuenzi | G07C 9/00309 455/41.1 |
| 2015/0332527 | A1* | 11/2015 | Pukari | G07C 9/00119 70/277 |

* cited by examiner

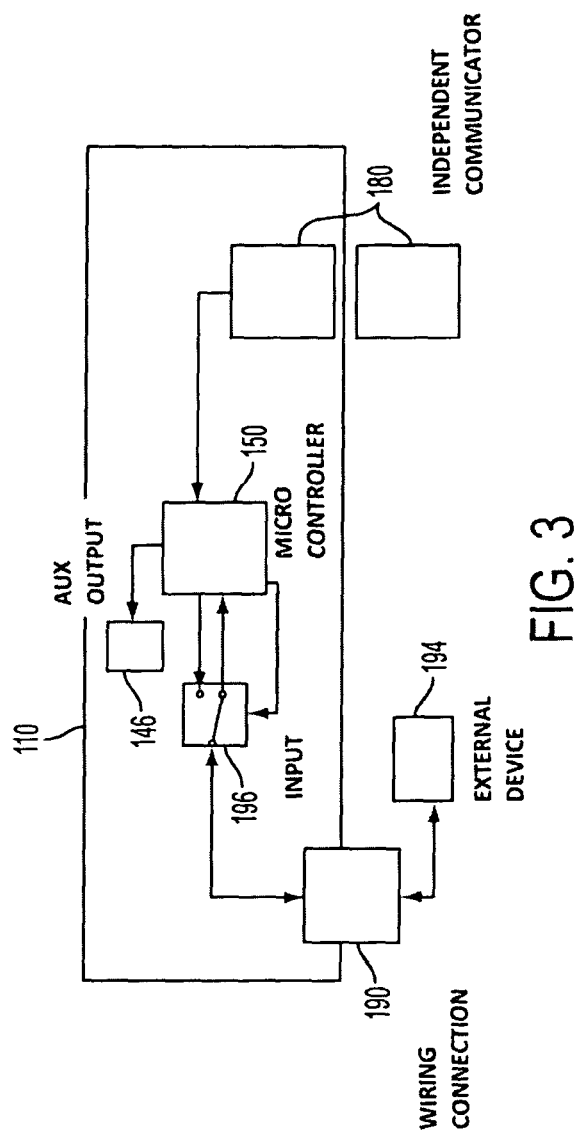

LOCKING SWITCH ASSEMBLY AND RELATED METHODS

PRIORITY CLAIM

This application claims priority to U.S. Provisional Application No. 61/903,356 that was filed on 12 Nov. 2013. The entire content of this provisional application is hereby incorporated herein by reference.

TECHNICAL FIELD

The various embodiments described herein relate generally to control switches, such as locking switches for machine guarding applications, and more particularly relate to switches configured to change between two or more different modes of operation.

BACKGROUND

Certain switching devices are known and are in use for controlling devices in technical installations in a manner to prevent human access to machines, such as presses and so forth. Typically, such switching devices are configured to facilitate partial or complete shutdown of electrically driven machines/devices of the technical installation to avoid or reduce the opportunities of access to equipment when operational.

Switching devices have different models to provide different modes of operation. One type of such a switching device is a door switch that includes a Power to release mode. Another type of switching device is a door switch that includes a Power to lock mode. Other modes of operation relate to auxiliary outputs or LED indications.

Certain manufacturers provide separate switching devices having different catalog numbers, or multiple vendors are necessary for switch functionality or modes. However, this results in increased inventory of the switching devices which may be expensive to maintain. Other options include creating a locking switch has includes a network connection with configuration. However, this is also an expensive option.

Accordingly, it would be desirable to provide a switching device that can be purchased from a single vendor and can be configured to operate in multiple modes in absence of a network connection.

SUMMARY

A control assembly includes a locking device having at least a first mode of operation and a second mode of operation, the locking device configurable to change from the first mode of operation to the second mode of operation. The locking device has a non-contact sensor and a microcontroller. An independent communicator is configured to communicate configuration data to the microcontroller. The microcontroller is configured to change from the first mode of operation to the second mode of operation using configuration data received from the independent communicator.

In one or more embodiments, a locking switch assembly includes a locking device having at least a first mode of operation and a second mode of operation, where the locking device is configurable to change from the first mode of operation to the second mode of operation. The device includes a microcontroller to change from the first mode of operation to the second mode of operation. The locking switch further includes one or more inputs coupled with the microcontroller, and the locking device having a wiring connection. The assembly further includes a communicator configured to communicate configuration data to the microcontroller via the wiring connection.

A method includes presenting an independent communicator having configuration data within sensing distance of a locking device, where the locking device having at least a first mode of operation and a second mode of operation, and the locking device is configurable to change from the first mode of operation to the second mode of operation. The locking device has a non-contact sensor and a microcontroller.

The sensor of the locking device senses the independent communicator when the communicator is placed within sensing distance of the locking device. The communicator includes configuration data for the locking device.

The method further includes transferring configuration data from the communicator to the locking switch. The configuration data can include data relating to operational modes of the device, such as, but not limited to power modes, auxiliary modes, and LED operation.

The method includes changing the locking device from a first mode of operation to a second mode of operation with a microcontroller using the configuration data from the communicator. Optionally, changing the locking device from a first mode of operation to a second mode of operation includes changing from a POWER-TO-LOCK mode to a POWER-TO-RELEASE mode.

In one or more embodiments, the method further includes storing configuration data to non-volatile memory. In one or more embodiments, the method includes sending confirmation to from microcontroller that change from first mode of operation to second mode of operation has occurred.

BRIEF DESCRIPTION OF THE DRAWINGS

FIG. 3 illustrates a block diagram of a locking switch assembly according to one or more embodiments.

DETAILED DESCRIPTION

The following detailed description refers to the accompanying drawings that show, by way of illustration, specific details and embodiments in which the invention may be practiced. These embodiments, which are also referred to herein as "examples," or "options" are described in sufficient detail to enable those skilled in the art to practice the invention.

A system including a control device having a first mode of operation and a second mode of operation, and is configurable by an end user to change the control device from operating in the first mode to the second mode, or from the second mode to the first mode. The new configuration can be done though non-contact sensing methods, in absence of a network and without requiring the end use to open the device, which can cause sealing issues. The configuration can be modified by the end user to change the behavior of the switch. In one or more examples, the control device includes a non-contact interlock device, such as a guard locking device. The guard locking device, in one or more embodiments, includes a guard locking switch for use in industrial applications In one or more embodiments, the modes of operation relate to, but are not necessarily limited to, a device with locking when power applied, locking when power removed, auxiliary outputs and LED indications.

Figure 1:
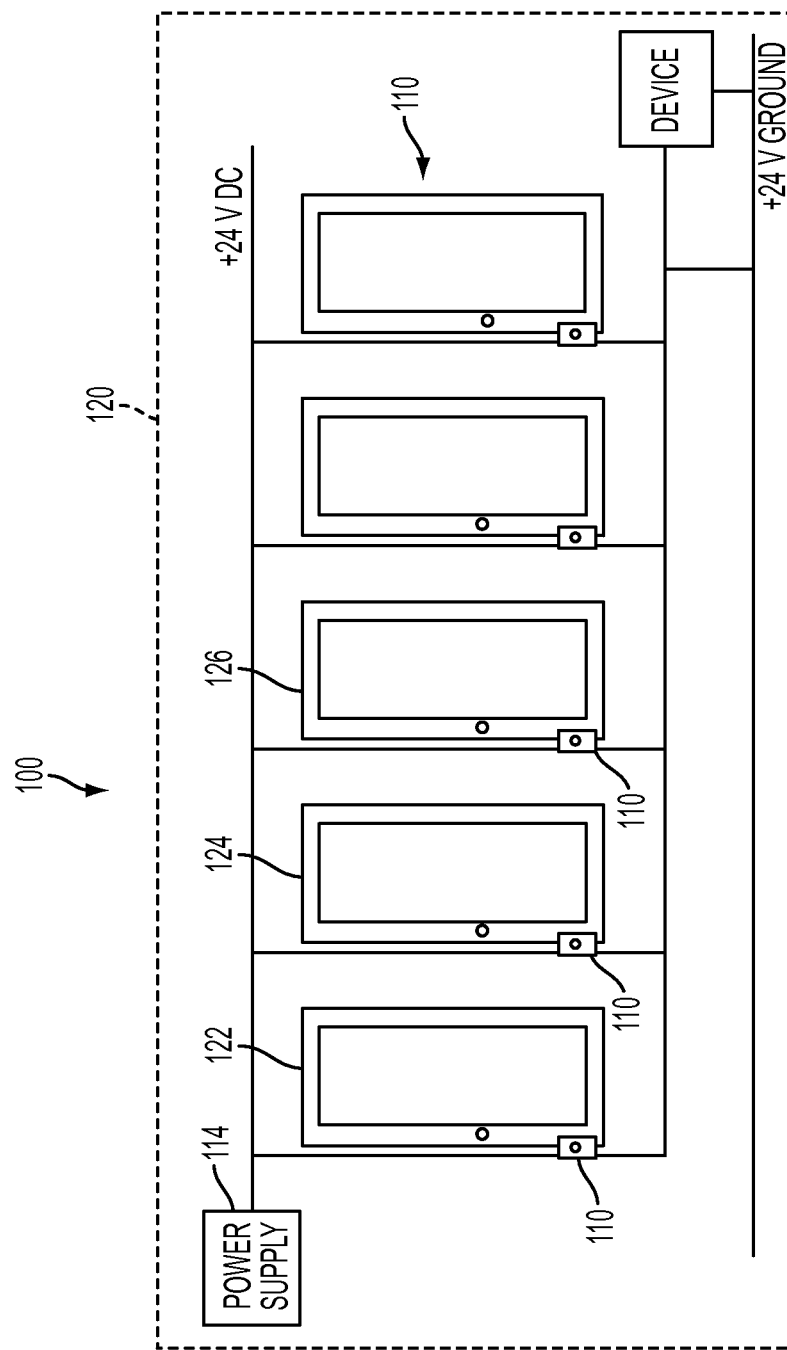
FIG. 1 illustrates a block diagram of a system according to at least one embodiment.

A system including a control switch such as a locking switch assembly 100 is shown in FIG. 1. The locking switch assembly 100, in one or more embodiments, is used in industrial applications to prevent human access to machines, such as presses or equipment which can cause bodily harm, or expensive equipment. In one or more embodiments, the locking switch assembly 100 is configured to facilitate partial or complete shutdown of electrically driven machines/devices of the technical installation to avoid or reduce the opportunities of access to equipment when operational. One typical application of such a switching device is a door switch.

Referring to FIG. 1, system within a controlled access environment 120 is shown. The system includes a power supply 114 to power a plurality of locking devices 110 disposed on access doors 122, 124 and 126 respectively of the installation. In one or more embodiments, the power supply 114 includes a 24 volts DC power supply. The locking devices 110, in one or more embodiments, are configured to monitor a status of each of the access doors 122, 124 and 126 and to interrupt operation of the installation completely or partially to prevent uncontrolled access to the installation when the doors 122, 124 and 126 are open. In one or more embodiments, the locking devices 110 are not connected via a network.

Each of the locking devices 110 includes a non-contact sensor disposed on a stationary component such as a frame of each of the access doors 122, 124 and 126 and a target such as an actuator disposed on a movable component such as on surface of each of the access doors 122, 124 and 126. In a closed state of the access doors 122, 124 and 126, the actuator is located within the sensing range of the sensor, which causes an enable signal to be generated. Alternatively, in an open state of any of the access doors 122, 124 and 126, the actuator is removed from the sensing range of the sensor, which generates a switching signal for interrupting operation of one or more components of the installation completely or partially through one or more devices.

In certain embodiments, the system includes output signal switching devices (OSSDs) that are configured to switch DC powered devices, such as contactors and control relays of the installation. In one or more embodiments, the OSSDs include PNP type transistors with short circuit protection, overload protection and crossfault detection.

Figure 2:
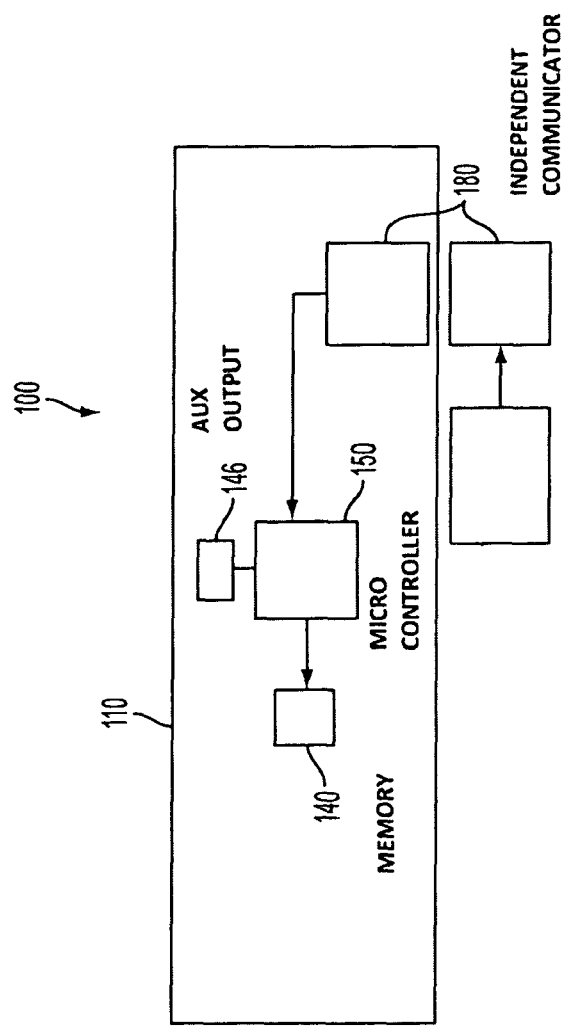
FIG. 2 illustrates a block diagram of a locking switch assembly according to one or more embodiments.

Referring to FIG. 2, in one or more embodiments, the locking switch assembly 100 includes a locking device 110. The locking device 110 has at least a first mode of operation and a second mode of operation, and the locking device is configurable to change from the first mode of operation to the second mode of operation.

In one or more embodiments, the locking device 110 includes at least one non-contact sensor. Types of suitable sensors include, but are not limited to, optical sensors. The sensor uses a receiver to receive and transmit the configuration data to the device 110 to determine the configuration. The term configuration relates to defining the logic and/or behavior of the locking switch assembly 100.

The locking device 110 further includes a microcontroller 150. In one or more embodiments, the microcontroller 150 is configured to receive configuration data from the sensor, and to use the configuration to modify a mode of operation of the device 110. The microcontroller 150 is configured to change from the first mode of operation to the second mode of operation using configuration data received from an independent communicator and/or actuator. The microcontroller 150 changes the operation and configuration of the locking device 110 based on the configuration data. The microcontroller 150 receives the configuration data that is transmitted through the non-contact sensing. The microcontroller 150 processes the configuration data and stores it to the memory 140. During use, the microcontroller retrieves the information to be used in the logic of the device.

The microcontroller 150 is not limited to any particular processor for performing the processing tasks of the invention. The term "microcontroller," as that term is used herein, is intended to denote any machine capable of performing the calculations, or computations, necessary to perform the tasks recited herein. The term "microcontroller" is intended to denote any machine that is capable of accepting a structured input and of processing the input in accordance with prescribed rules to produce an output. It should also be noted that the phrase "configured to" as used herein means that the microcontroller is equipped with a combination of hardware and software for performing the tasks recited and/or shown herein.

In one or more embodiments, the locking device 110 includes memory 140, such as non volatile memory, where the microcontroller stores the configuration data. Non volatile memory can include read only memory (ROM), programmable ROM (PROM), electrically programmable ROM (EPROM), electrically erasable programmable ROM (EEPROM), or flash memory.

The locking switch includes a means of communicating the configuration data, in an embodiment, in the absence of a network connection. In one or more embodiments, the means of communicating the configuration data includes an independent communicator 180. In one or more embodiments, the independent communicator 180 also functions as the actuator. In one or more embodiments, the independent communicator includes an RFID component that is sensed by the device when appropriately placed and/or presented. In another embodiment, the independent communicator 180 includes a transmitter and a receiver, where in one or more embodiments, the receiver is part of the locking switch.

The RFID component can transfer data from an RFID tag via wireless communication, wherein the RFID tag can include configuration data that can be utilized by the locking switch. The RFID component can be, but is not limited to, various components that read, write, receive, and/or store electronic product data, such as, readers, writers and/or servers, and can be a handheld device or a fixed-mount device depending on the particular application. In one or more embodiments, the RFID component can be provided to the end user, and if an end user wanted a different configuration, the RFID tag could be swapped out with the new configuration data. In one or more embodiments, multiple communicators, for example RFID tags can be provided with the different configurations, and the end user installs the particular tag having the configuration data for the desired configuration. In one or more embodiments, the RFID tag is programmable or a tool is provided to modify the configuration data of the RFID tag to allow the end user to configure the locking device in a desired configuration.

The configuration data will include information that provides an indication to the locking device that the device is about to be configured. The configuration data will include data to instruct the device 110, or the microcontroller 150 about which configuration is desired. In one or more embodiments, the configuration will be a mode in which the switch will operate. The modes include, but are not limited to, POWER-TO-LOCK mode or a POWER-TO-RELEASE mode. In one or more embodiments, the configuration data will relate to a configuration in which the auxiliary outputs 146 are modified, such as relating to indicating a state of the inputs of the locking switch including device type, inputs, door sensing, lock sensing. Additional examples of configurations are as follows. Examples for Device Type configurations include: 1) Power to Lock—switch is mechanically locked when power to the LOCK input is applied; 2) Power to Release—switch is mechanically unlocked when power to the LOCK input is removed.

Options for Auxiliary Output Behavior configurations include: 1) Device Type: Output state indicates either Power to Lock or Power to Release configuration (Ex. HI=PTL, LO=PTR); 2) Lock Input state: Output state indicates state of Lock Input (Ex. HI=Lock input HI, LO=Lock input LO); 3) Door Sensing State: Output state indicates state of Door Sensing input (Ex. HI=RFID signal received, LO=RFID signal not received); 4) Lock Sensing State: Output state indicates state of Lock Sensing input (Ex. HI=Door Locked signal received, LO=Door Unlocked signal not received).

Options for LED Behavior configurations include: 1) Device Type: LED output state indicates either Power to Lock or Power to Release configuration by change of flash pattern (Ex. Flash Pattern A=PTL configuration, Flash Pattern B=PTR configuration); 2) Lock Input state: LED output state indicates state of Lock Input by change of flash pattern (Ex. Flash Pattern C=Lock input HI, Flash Pattern D=Lock input LO); 3) Door Sensing State: LED output state indicates state of Door Sensing input by change of flash pattern (Ex. Flash Pattern E=RFID signal received, Flash Pattern F=RFID signal not received); 4) Lock Sensing State: LED output state indicates state of Lock Sensing input by change of flash pattern (Ex. Flash pattern G=Door Locked signal received, Flash Pattern H=Door Unlocked signal not received).

Typically, the locking switch functions, in one or more embodiments, by extending a locking bolt from the device through a hole in an actuator, and preventing opening of a structure, such as a guard to machinery. The locking bolt drive mechanism and logic allow the locking bolt to extend only when the corresponding actuator is detected within range. The appropriate actuator is detected, for example, by an RFID having RFID coding. The RFID coding can include coding to operate in a POWER-TO-LOCK mode or a POWER-TO-RELEASE mode. The locking bolt drive mechanism uses, for example, a bi-stable solenoid to move the bolt.

Referring to FIG. 3, communication of the configuration data to the locking device 110 can be done via the locking device existing wiring connection 190. The wiring connection 190 can include, but is not limited to, connector, cable or screw terminals that are part of the switch. In one or more embodiments, an external device 194 is a communicator that can provide configuration data to the switch via the wiring connection 190. In one or more embodiments, the external device 194 includes a computer or dongle, for example.

In the embodiment as shown in FIG. 3, an input 196 of the device 110 is used to receive the configuration data and send it to the microcontroller 150, where the microcontroller 150 processes the data and stores the data in the memory 140, as discussed above. During use of the device 110, the microcontroller 150 retrieves the configuration data to be used in the logic of the locking device 110. In the event of a need or desire for confirmation data, the microcontroller 150 can control the input 196, and the input 196 can be bi-directional and send the confirmation data via the input line 196 and confirm with locking device has been configured.

In one or more embodiments, an end user further has an option to change a configuration of the locking switch without having to replace the switch. In one or more embodiments, a method includes presenting an independent communicator having configuration data within sensing distance of a locking device, where the locking device having at least a first mode of operation and a second mode of operation, and the locking device is configurable to change from the first mode of operation to the second mode of operation. The locking device has a non-contact sensor and a microcontroller.

The sensor of the locking device senses the independent communicator when the communicator is placed within sensing distance of the locking device. The communicator includes configuration data for the locking device.

The method further includes transferring configuration data from the communicator to the locking switch. The configuration data can include data relating to operational modes of the device, such as, but not limited to power modes, auxiliary modes, and LED operation.

The method includes changing the locking device from a first mode of operation to a second mode of operation with a microcontroller using the configuration data from the communicator. Optionally, changing the locking device from a first mode of operation to a second mode of operation includes changing from a POWER-TO-LOCK mode to a POWER-TO-RELEASE mode.

In one or more embodiments, the method further includes storing configuration data to non-volatile memory. In one or more embodiments, the method includes sending confirmation to from microcontroller that change from first mode of operation to second mode of operation has occurred.

Changing of the mode of operation for the device can include changing several different parameters. For example, in one or more embodiments, changing the locking device from a first mode of operation to a second mode of operation includes changing auxiliary output. In one or more embodiments, changing the locking device from a first mode of operation to a second mode of operation includes changing LED indicator operation. In a further option, changing LED indicator operation includes configuring the locking device to indicate a status of device type, inputs, door sensing, lock sensing, or faults.

The above Detailed Description is intended to be illustrative, and not restrictive. The various embodiments are not necessarily mutually exclusive, as some embodiments can be combined with one or more other embodiments to form new embodiments. For example, the above-described embodiments (and/or aspects thereof) embodiments may be combined, utilized and derived therefrom, such that structural and logical substitutions and changes may be made without departing from the scope of this disclosure. Such embodiments of the inventive subject matter may be referred to herein, individually and/or collectively, by the term "invention" merely for convenience and without intending to voluntarily limit the scope of this application to any single invention or inventive concept if more than one is in fact disclosed. Many other embodiments will be apparent to those of skill in the art upon reviewing the above description. The scope of the invention should, therefore, be determined with reference to the appended claims, along with the full scope of equivalents to which such claims are entitled.

The methods described herein do not have to be executed in the order described, or in any particular order, unless it is otherwise specified that a particular order is required. Moreover, unless otherwise specified, various activities described with respect to the methods identified herein can be executed in repetitive, simultaneous, serial, or parallel fashion.

The terms "a" or "an" are used, as is common in patent documents, to include one or more than one. The term "or" is used to refer to a nonexclusive or, unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring the abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment with each embodiment being combinable with each other embodiment.

What is claimed is:

1. A locking switch assembly comprising:
a locking device having at least a first mode of operation and a second mode of operation, the locking device configurable to change from the first mode of operation to the second mode of operation, wherein the first mode of operation is POWER-TO-LOCK in which a locking switch is mechanically locked when power to a lock input is applied, and the second mode of operation is POWER-TO-RELEASE in which the locking switch is mechanically unlocked when power to the lock input is applied;
the locking device having a non-contact sensor;
the locking device including a microcontroller;
an independent communicator having configuration data, the configuration data relating to the first mode of operation and the second mode of operation, the independent communicator configured to communicate configuration data to the microcontroller via the non-contact sensor; and
the microcontroller configured to change from the first mode of operation to the second mode of operation using configuration data received from the independent communicator.

2. The locking switch assembly as recited in claim 1, further comprising an actuator configured to communicate with the non-contact sensor.

3. The locking switch assembly as recited in claim 2, wherein the actuator includes the independent communicator.

4. The locking switch assembly as recited in claim 1, wherein the independent communicator is an RFID.

5. The locking switch assembly as recited in claim 1, wherein the first mode and second mode of operations include auxiliary output.

6. The locking switch assembly as recited in claim 5, wherein the auxiliary output indicates one or more of device type, inputs, door sensing, or lock sensing of the locking device.

7. The locking device as recited in claim 1, wherein the first mode and second mode of operations include LED operation.

8. The locking switch assembly as recited in claim 7, wherein the LED operation includes an indication of one or more of device type, inputs, door sensing, lock sensing of the locking device, or device faults.

9. The locking switch assembly as recited in claim 1, further comprising non-volatile memory configured to store the configuration data.

10. A locking switch assembly comprising:
a locking device having at least a first mode of operation and a second mode of operation;
the locking device configurable to change from the first mode of operation to the second mode of operation, wherein the first mode of operation is POWER-TO-LOCK in which a locking switch is mechanically locked when power to a lock input is applied, and the second mode of operation is POWER-TO-RELEASE in which the locking switch is mechanically unlocked when power to the lock input is applied;
the locking device including a microcontroller to change from the first mode of operation to the second mode of operation;
one or more inputs coupled with the microcontroller,
the locking device having a wiring connection; and
a communicator configured to communicate configuration data to the microcontroller via the wiring connection.

11. A method for changing a mode of operation of a locking switch assembly, the method comprising:
presenting an independent communicator having configuration data within sensing distance of a locking device, the locking device having at least a first mode of operation and a second mode of operation, the locking device configurable to change from the first mode of operation to the second mode of operation, the locking device having a non-contact sensor and a microcontroller;
transferring configuration data from the communicator to the locking switch;
the microcontroller changing the locking device from a first mode of operation to a second mode of operation with a microcontroller using the configuration data from the communicator; and
wherein changing the locking device from a first mode of operation to a second mode of operation includes changing from a POWER-TO-LOCK mode to a POWER-TO-RELEASE mode, when the first mode of operation is POWER-TO-LOCK a locking switch is mechanically locked when power to a lock input is applied, and when the second mode of operation is POWER-TO-RELEASE the locking switch is mechanically unlocked when power to the lock input is applied.

12. The method as recited in claim 11, further comprising storing configuration data to non-volatile memory.

13. The method as recited in claim 11, further comprising sending confirmation from microcontroller that change from first mode of operation to second mode of operation has occurred.

14. The method as recited in claim 11, wherein changing the locking device from a first mode of operation to a second mode of operation includes changing auxiliary output.

15. The method as recited in claim 11, wherein changing the locking device from a first mode of operation to a second mode of operation includes changing LED indicator operation.

16. The method as recited in claim 15, wherein changing LED indicator operation includes configuring the locking device to indicate a status of device type, inputs, door sensing, lock sensing, or faults.

* * * * *